July 10, 1956 — C. F. DOEPPEL — 2,754,042
FUNNEL STOPPERS
Filed Feb. 15, 1952
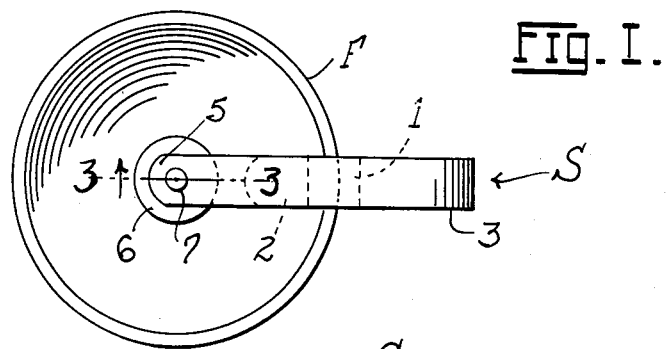
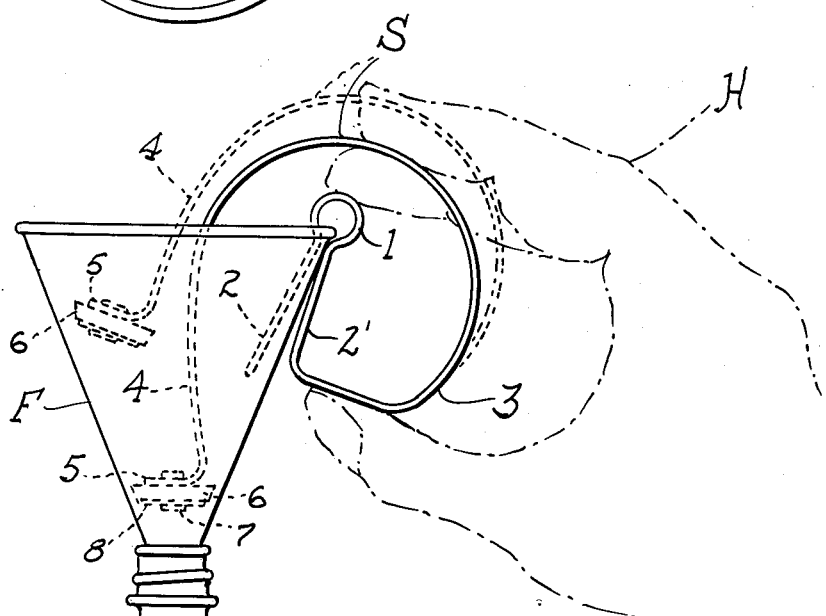
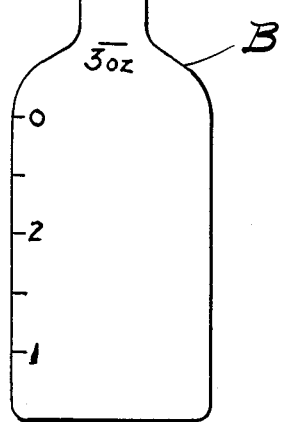
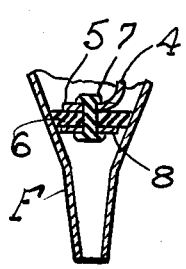
INVENTOR.
Carl F. Doeppel.
BY Harry A. Beimes
ATTORNEY.

United States Patent Office 2,754,042
Patented July 10, 1956

2,754,042

FUNNEL STOPPERS

Carl F. Doeppel, St. Louis, Mo.

Application February 15, 1952, Serial No. 271,680

3 Claims. (Cl. 226—36)

My invention has relation to improvements in funnel stoppers, and it consists in the novel features of construction more fully set forth in the specification and pointed out in the claims.

The object of the invention is to provide a funnel stopper which may be clamped on the funnel and which may be manually manipulated to shut off the flow of the liquid being placed in the receptacle in which the funnel is disposed.

The manner of accomplishing this object, as well as the advantages inherent in the invention, will be better apparent from a detailed description of the invention in connection with the accompanying drawings, in which:

Fig. 1 is a top plan of a funnel with my improved stopper attached thereto; Fig. 2 is a side elevation of a bottle and funnel disposed therein together with my improved stopper shown in position to close the funnel (solid lines) and in position to permit a free flow of liquid from the funnel to the bottle (dotted lines); and Fig. 3 is a cross-sectional detail taken on the line 3—3 of Fig. 1.

Referring to the drawings, B represents a bottle in neck of which is disposed a funnel F to facilitate the filling thereof. It is a matter of common knowledge that, unless extreme care is exercised, it often happens that more liquid is poured into the funnel F than may be contained in the bottle B. Of course, this causes spillage and a consequent waste of the liquid substance with its attendant mess and loss.

I have sought to obviate this difficulty by providing a funnel stopper S which is so constructed that it may be effectively used over a wide range of funnel sizes.

My improved stopper S embodies a spring clamp comprising a spring hinge 1 from which clamp members 2, 2' extend so as to embrace the conical wall of the funnel F. The clamp member 2' has a spring bow 3 bent from it, said bow extending above the hinge 1 and carrying a depending shank 4 which extends downwardly into the funnel F when the stopper is clamped thereon (Fig. 2). The shank 4 has a toe-piece 5 bent laterally from it to which a valve 6 is secured by a rivet 7. The valve 6 is preferably made of rubber or similar yielding material so as to fit snugly in the throat of the funnel to close it when desired. A metallic washer 8 is placed over the bottom surface of the valve 6 for reasons well understood in the art.

The operation of my improved stopper will be readily apparent from Fig. 2. When the bottle has been filled to the desired extent, the operator grasps the bow 3 of the stopper S between his thumb and fingers (dot and dash showing) and compresses said bow to force the valve 6 down into the throat of the funnel F and thereby close the same. He may now remove the funnel without spilling the contents remaining therein. Obviously, while the bottle B is being filled the stopper S is not restrained and assumes the position shown dotted (Fig. 2).

It should be readily apparent from the foregoing description and drawing, that the size of the bow 3 permits a wide range of movement of valve 6 to fit many different sizes of funnels.

The material from which the stopper is made (except valve 6) should, of course, possess considerable resiliency. Many materials having this requirement are found among metallic alloys and plastics and are well known in kindred arts.

Having described my invention, I claim:

1. A funnel stopper comprising a supporting member having a valve affixed at one end, a spring clamp at the opposite end, and an intermediate spring bow formed integrally with the spring clamp, and enveloping the clamp with clearance so as to be compressible to actuate the valve.

2. A funnel stopper comprising a valve and a supporting member therefor, said supporting member being formed of a ribbon of resilient material bent in the shape of a bow, said bow having a shank carrying said valve and a spring clamp having oppositely disposed members for engaging the funnel, the bow enveloping the clamp with clearance so as to be compressible to actuate the valve.

3. A funnel stopper comprising a supporting member having a valve affixed at one end, a spring clamp at the opposite end, said clamp comprising a spring hinge and gripping fingers extending therefrom, and an intermediate spring bow formed integrally with the spring clamp and enveloping the same.

References Cited in the file of this patent

UNITED STATES PATENTS 1,585,761    Canale _____ May 25, 1926

FOREIGN PATENTS 656,296    France _____ Jan. 2, 1929